United States Patent
Wool

(10) Patent No.: US 8,418,240 B2
(45) Date of Patent: Apr. 9, 2013

(54) REORDERING A FIREWALL RULE BASE ACCORDING TO USAGE STATISTICS

(75) Inventor: Avishai Wool, Petah Tikva (IL)

(73) Assignee: Algorithmic Security (Israel) Ltd., Ramat Gan (IL)

( * ) Notice: Subject to any disclaimer, the term of this patent is extended or adjusted under 35 U.S.C. 154(b) by 593 days.

(21) Appl. No.: 12/344,231

(22) Filed: Dec. 25, 2008

(65) Prior Publication Data

US 2009/0172800 A1   Jul. 2, 2009

Related U.S. Application Data

(60) Provisional application No. 61/008,967, filed on Dec. 26, 2007.

(51) Int. Cl.
*G06F 9/00* (2006.01)
(52) U.S. Cl. .......................................................... 726/11
(58) Field of Classification Search ...................... 726/11
See application file for complete search history.

(56) References Cited

U.S. PATENT DOCUMENTS

| | | | |
|---|---|---|---|
| 6,606,710 B2 * | 8/2003 | Krishnan et al. ................. | 726/13 |
| 2003/0225877 A1 * | 12/2003 | Packman et al. ............... | 709/224 |
| 2005/0204402 A1 * | 9/2005 | Turley et al. ..................... | 726/11 |
| 2006/0248580 A1 * | 11/2006 | Fulp et al. ........................ | 726/11 |

* cited by examiner

*Primary Examiner* — Cordelia Zecher
(74) *Attorney, Agent, or Firm* — Martin Fleit; Paul D. Bianco; Fleit Gibbons Gutman Bongini & Bianco PL

(57) ABSTRACT

A computer implemented method of reducing central processing unit (CPU) usage of a firewall by safe reordering a current firewall's rule-base exhibiting N rules. The method comprising: receiving rule usage statistics exhibiting usage frequency of each rule on the current firewall's rule-base; calculating a rules matched per packet (RMPP) parameter, being a summation of products of each rule identifier and the corresponding usage frequency for all the N rules; determining an alternative order of the rule base by repositioning rules, wherein the repositioned rules perform the same action on the firewall, or wherein the repositioned rules act on disjoint sets of network connections, and wherein the repositioning results in a reduction of the RMPP of the reordered rule base, thereby reducing the CPU usage of the firewall in implementing the alternative order of rules.

16 Claims, 5 Drawing Sheets

500

| | Rule # | Source | Destination | Service | Action |
|---|---|---|---|---|---|
| B1 | 1 | Any | Any | Tcp/135 | DROP |
| | 2 | Any | Any | Tcp/445 | DROP |
| B2 | 3 | Any | 1.2.3.4 | http | PASS |
| | ... | | | | PASS |
| | 10 | Biz-partner-1 | Our-db | sqlnet | PASS |
| B3 | 11 | 7.7.7.7 | Any | Any | DROP |
| | ... | | | | DROP |
| | ... | | | | DROP |
| | 28 | BadGuyz.com | Any | Any | DROP |
| B4 | 29 | mail-provider | 5.6.7.8 | smtp | PASS |
| | ... | | | | PASS |
| | ... | | | | PASS |
| | ... | | | | PASS |
| | N-1 | Our-dns-server | Any | Udp/53 | PASS |
| B5 | N | Any | Any | Any | DROP |

FIG. 4

REORDERING A FIREWALL RULE BASE ACCORDING TO USAGE STATISTICS

CROSS-REFERENCE TO RELATED APPLICATIONS

This application claims the benefit under 35 U.S.C. §119(e) of U.S. Provisional Patent Application No. U.S. 61/008,967 filed on Dec. 26, 2007, the content of which is incorporated by reference herein in its entirety.

BACKGROUND

1. Technical Field

The present invention relates to the field of firewalls implemented on networked computers, and more particularly, to reordering the rule-base within such firewalls for reducing central processing unit (CPU) usage of said firewalls.

2. Discussion of the Related Art

Firewalls are integrated collection of security measures designed to prevent unauthorized electronic access to a networked computer system. It may also assume the form of a device or set of devices configured to permit, deny, encrypt, decrypt, or proxy all computer traffic between different security domains based upon a set of rules and other criteria. Organizations that use internet protocol (IP) based communication networks have firewalls to control the traffic that crosses into and out of their networks, or between different network segments. Each firewall is basically a special-purpose computer that is enforcing the organization's traffic filtering policy. The filtering policy is implemented in a rule-base, which is an ordered list of rules. Each rule consists of a set of field value-ranges, and an associated action—which is typically either "PASS" or "DROP".

Most firewalls enforce the policy according to "first-match" semantics: for each new IP connection, the firewall checks the rules one by one, according to their order in the rule-base, until it finds a rule that matches the new connection. The first rule that matches the connection determines the firewall's action: if the first matching rule has an action of "PASS" then the firewall will allow the connection to continue, and if the rule's action is "DROP" then the firewall will discard all the packets belonging to the connection. If no rule matches the connection then the firewall uses a default action, which is usually DROP.

Most firewalls implement the first-match semantics algorithm in software or firmware, using standard list or array data structures to maintain the rule-base. In such an implementation, the computational effort to match a connection to the rule-base is proportional (linearly) to the number rules the firewall needs to try in sequence until it reaches the first matching rule. If checking a match against one rule typically requires M computer instructions, then checking K rules in sequence requires K*M instructions. If the first-matching rule happens to be one of the first in the rule-base then the firewall will reach its action quickly and with a low computational effort. Conversely, if the first-matching rule is near the end of the rule-base, the firewall will work harder to reach an action.

The firewall's CPU utilization is the fraction of time that the firewall's CPU is actively executing commands that are part of its filtering activity (rather than waiting in an idle state). If the average utilization is high then the firewall may be unable to process all the connections attempting to go through it fast enough. If this occurs the firewall either drops connections indiscriminately, including connections that should be allowed according to the policy (this is a "fail-closed" strategy), or permits connections that should not be allowed (this is a "fail-open" strategy). Both failure types are undesirable, and it is one of the tasks of firewall administrators to ensure that neither failure occurs. Therefore, firewall administrators strive to keep the average firewall CPU utilization low, for example at 30% utilization or lower.

Clearly, the CPU utilization of a firewall depends on the speed of the CPU, on the general traffic load, and on the number of rules in the rule-base, but most crucially it depends on whether the order of the rules in the rule-base is tuned in the best possible way to the distribution of connections that the firewall is filtering. Specifically, if we wish to reduce the CPU utilization of the firewall, intuitively we would want to place the most popular rules (those that match large portions of the traffic) as close as possible to the beginning of the rule base.

Unfortunately, one cannot reorder the firewall rules arbitrarily when trying to reduce the CPU utilization. Moving a rule from its current position to another may alter the action that the firewall makes on some, or all, of the connections that match the rule that is being moved. Moving a rule R1 closer to the beginning of the rule base may cause it to supersede another rule R2. Such a change could cause some connections that were matched by R2 before the rule-move to now be matched by the earlier R1. If R1 and R2 have different actions (e.g., one is PASS and the other is DROP) then moving R1 to be ahead of R2 changes the filtering policy that the rule-base is enforcing. Therefore, moving R1 to be ahead of R2 is deemed an "unsafe" repositioning.

BRIEF SUMMARY

According to one aspect of the present invention, there is provided a computer implemented method of reducing central processing unit (CPU) usage of a firewall by safe reordering a current firewall's rule-base exhibiting N rules, each rule associated with a rule identifier affiliated with the order of applying the rule and a corresponding rule usage frequency, thereby creating an alternative order of the firewall's rules, the method comprising: receiving rule usage statistics exhibiting usage frequency of each rule on the current firewall's rule-base; calculating a rules matched per packet (RMPP) parameter, being a summation of products of each rule identifier and the corresponding usage frequency for all the N rules; determining an alternative order of the rule base by repositioning rules which perform the same action on the firewall, or which act on disjoint sets of network connections, and wherein the repositioning results in a reduction of the RMPP of the reordered rule base, thereby reducing the CPU usage of the firewall in implementing the alternative order of rules.

According to another aspect of the invention, there is provided a computer implemented data processing system for reducing central processing unit (CPU) usage of a firewall by safe reordering a current firewall's rule-base exhibiting N rules, each rule associated with a rule identifier affiliated with the order of applying the rule and a corresponding rule usage frequency, thereby creating an alternative order of the firewall's rules, the system comprising: a rule reorder engine; and a rules matched per packet (RMPP) calculator, wherein rule usage statistics exhibiting usage frequency of each rule on the current firewall's rule-base are fed into the rule reorder engine; and wherein the RMPP calculator receives the current firewall's rule base and calculates the RMPP, being a summation of products of each rule identifier and the corresponding usage frequency for all the N rules using the RMPP calculator; and wherein the rule reorder engine determines an alternative order of the rule base, in cooperation with the RMPP calculator, by repositioning rules and recalculating the RMPP of the reordered rule base, which the repositioned rules perform the same action on the firewall, or act on disjoint sets of network connections, and wherein the repositioning results in a reduction of the RMPP of the reordered rule base, thereby reducing the CPU usage of the firewall in implementing the alternative order of rules.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings:

FIG. 4 is a chart showing an aspect of the some embodiments of the present invention.

Figure 1:
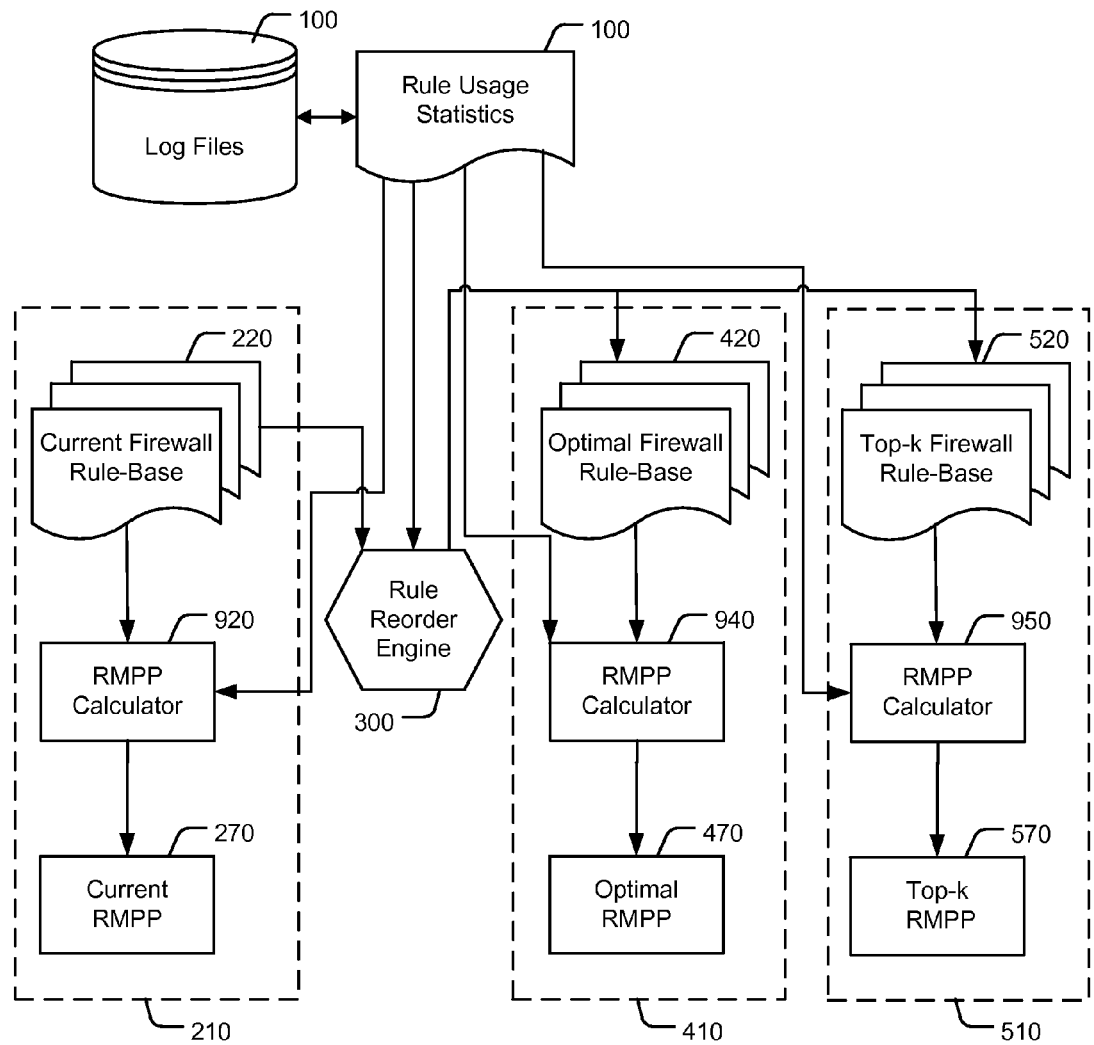
FIG. 1 is a high level schematic block diagram of the data processing system according to some embodiments of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
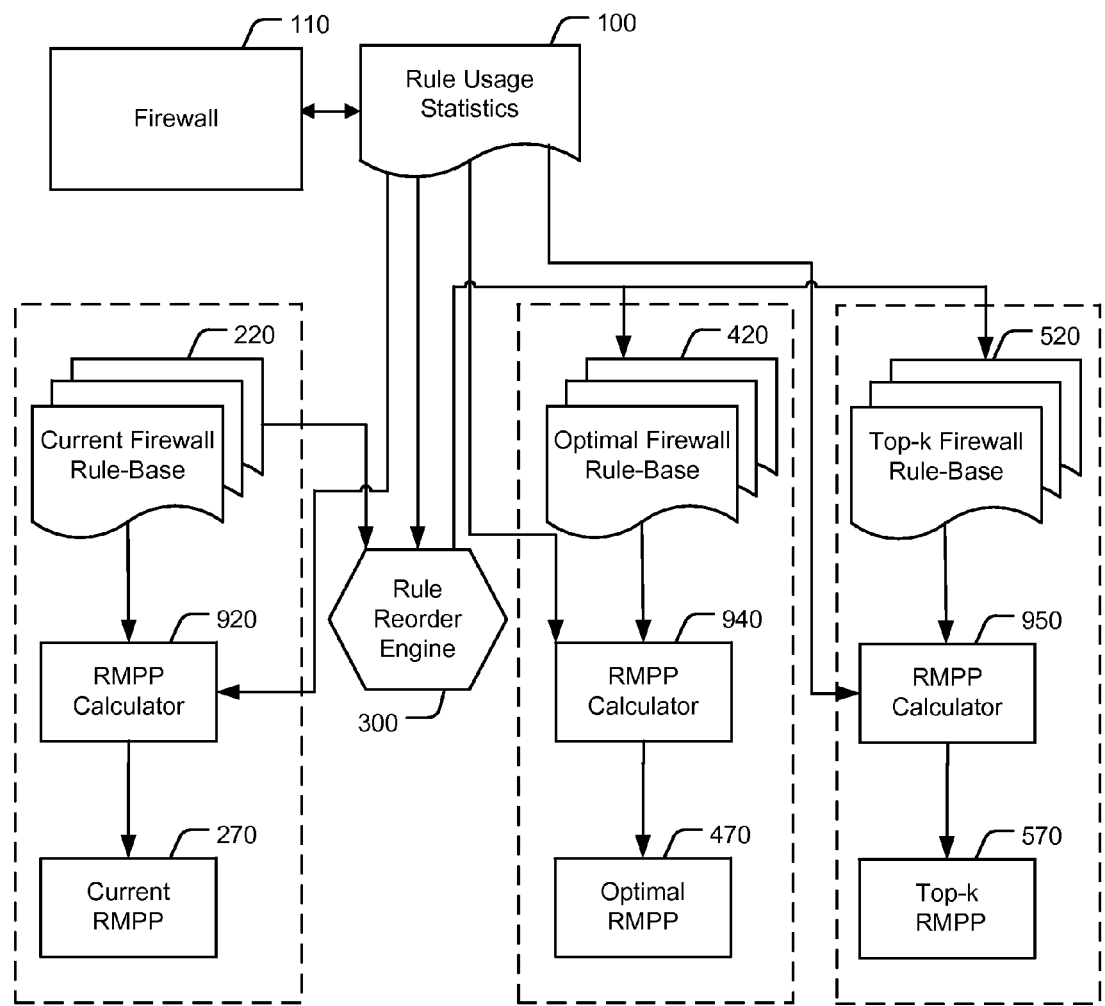
FIG. 2 is another high level schematic block diagram of the data processing system according to some embodiments of the invention.

FIGS. 1 and 2 is a high level schematic block diagram of the system according to some embodiments of the invention. A rule reorder engine 300 is in operative association with a log server 100 (FIG. 1) or directly in operative association with firewall 110 (FIG. 2). Rule reorder engine 300 is further is in operative association with a current firewall base-rule module 210, and at least one alternative reordered base-rule module, such as: an optimal firewall base-rule module 410, and a top-k firewall base-rule module 510. Each of firewall base-rule modules 210, 410 and 510 comprises a Rules Matched Per Packet (RMPP) calculator 920, 940, and 950 respectively.

In operation, rule usage statistics 150 are extracted from log server 100 (FIG. 1) or directly from firewall 110 (FIG. 2). Rule usage statistics 150 are then fed, together with current firewall rule-base 220 of current firewall base-rule module 210, to rule reorder engine 300. In response, rule reorder engine 300 may calculates any of two alternative rule-bases exhibiting of the same rules of current firewall rule-base 220 but with different rule orders. These new rule bases are: optimal firewall rule-Base 420 and Top-k Firewall Rule-Base 520. Reordering of the firewall rules is performed in view of the usage statistics of each and every rule while maintaining the outcome of the original order of the rules, referred herein in this application as "safe reordering". More specifically, the new orders of firewall rules is selected by optimizing it to reduce CPU usage, which is achieved by taking into account the frequency of usage of each and every firewall rule. For this purpose, embodiments of the present invention utilize a unique parameter, the "Rules Matched Per Packet" (RMPP) which indicates the expectancy of a particular rule base, given a particular ordering of the rules. During the reordering, the RMPP may be repeatedly calculated as will be explained below, for detecting the order having the lowest RMPP. This order, given practical considerations, will be optimal in CPU usage terms In the remaining of the description, embodiments of the invention will be discussed in detail, elaboration on the different variations of applying the aforementioned safe reordering of firewall rules that is performed for reducing CPU usage. For the sake of clarity, each section is headed with a corresponding title.

Rule Usage Statistics

Firewalls provide information about their actions in several ways. This information is used by some embodiments of the present invention to calculate the rule usage statistics 150. Rule usage statistics 150 may comprise one or more rule usage frequencies. Each rule is associated with a frequency F being a fraction between 0.0 and 1.0. Thus Rule i is associated with Frequency Fi and so forth. A rule base of N firewall rules therefore comprises N rules associated with N usage frequencies.

In some embodiments, in industry known firewalls made by Check Point, Juniper, and others, the firewall reports on its actions by writing records to a Log File 100. Each record in the log file typically corresponds to a single connection that the firewall filtered. The log record contains many fields, of which embodiments of the present invention utilizes: (a) timestamp, defining the date and time when the connection was filtered by the firewall, and (b) ruleID, being an identifier of the rule that ultimately matched the connection when the firewall executed its "first match semantics" algorithm. In some cases the ruleID is the sequence number of the rule in the rule-base. In other cases the ruleID is an identifier, not necessarily a number, which is associated with the rule.

According to some embodiments, given a Log File 100 and a range of dates defined by FromDate and ToDate, computing of rule usage statistics 150 is carried out in the following process: Let TotalLogs denote the total number of log records in log file 100 whose timestamp field is greater or equal to FromDate and smaller or equal to ToDate. Let Logsi denote the total number of log records in Log File 100 whose ruleID field corresponds to the identifier of rule i. Then, the Usage Frequency of Rule i is calculated by the following formula:

$$F_i = \frac{Logsi}{TotalLogs} \quad (1)$$

Rule Usage Statistics Based on Firewall Hit-Counters

In some other embodiments, typical of firewalls made by Cisco, the firewall reports on its actions by maintaining Hit Counters. A Hit Counter is an integer field that is attached to each rule. Firewall 110 keeps a Hit Counter field for each rule in its memory. For a given connection, firewall 110 increments the Hit Counter associated with the rule that ultimately matched said connection when the firewall executed its "first match semantics" algorithm. The Hit Counters are typically reset back to zero when the firewall 110 is powered up or when a special "clear counters" command is issued.

According to some embodiments, for a given firewall 110 that maintains Hit Counters, rule usage statistics 150 are computed in the following manner: Let HitCounti denote the value of the Hit Counter attached to rule i by Firewall 110. Let TotalCount denote the sum of the HitCounti values for all the rules according to the following formula:

$$TotalCount = \sum_{i=1}^{N} HitCount_i \quad (2)$$

Thus, Fi, the usage frequency of rule i is calculated by the formula:

$$F_i = \frac{HitCount_i}{TotalCount} \quad (3)$$

Dealing with Rule Insertions and Deletions

Firewall rule-bases change over time because of the evolving needs of the organization owning the firewall. In particular, rules are occasionally inserted into the rule-base or deleted from the rule-base. Such insertions and deletions potentially cause the rules to be renumbered. In particular, the sequence numbers of all the rules further down the list from the insertion or deletion point are incremented (for a rule insertion) or decremented (for a rule deletion). If such changes are not taken into account, rule usage statistics 150 will be inaccurate. For example, a firewall in which log file 100 records rule numbers in their ruleID field. If log file 100 shows that yesterday rule X matched a connection—today that same rule may have the number X+1 or X−1 because of other rules that were inserted or deleted before it. Thus, naively using the rule numbers as indexes when computing the Rule Usage Statistics 150 may distort the statistics by attributing activity to the wrong rules.

According to some embodiments of the invention, there is provided a measure to overcome this difficulty and to ensure that rule usage statistics 150 are accurate. In the case that rule usage statistics 150 are based upon a log file 100, there are three choices, depending on the capabilities of the firewall: Some firewalls, such as Check Point in their NGX or later models, associate a unique rule identifier ("rule_uid") to each rule. This "rule_uid" remains associated to its rule even if other rules are inserted or deleted above the rule. Furthermore, the log file 100 includes the "rule_uid" in each log record. For such firewalls, the current invention teaches to associate the "Usage Frequency of Rule i" with the rule whose "rule_uid" is "i" (i.e., in such cases "i" is not a number).

Some firewalls, such as Juniper Netscreens, associate a unique rule identifier ("rule_uid") to each rule. However, the Log File 100 does not include the rule_uid. Instead, log file 100 includes the matching rule number, according to the rule's sequence number in the rule-base at the time the connection was filtered. For such firewalls, the current invention teaches to translate the rule number into the unique rule_uid according to the order of the rules in the rule-base at the time the Log File 100 is collected. Thus, we again associate the "Usage Frequency of Rule i" with the rule whose "rule_uid" is "i" (i.e., in such cases "i" is not a number).

In the case that the rule does not have any unique identifier, the "Usage Frequency of Rule i" will use "i" as the rule number. In the case that rule usage statistics 150 are based upon a Firewall 110 that maintains Hit Counters we have a different difficulty: the Hit Counters are reset to zero occasionally, and the Firewall 110 does not maintain long-term histories. For instance, this is typical of Cisco's firewalls and routers.

In order to add support for long-term rule usage statistics 150, the current invention teaches the following: We compute our own unique rule_uid and associate it to the rule. For long-term use we store the HitCounti values when "i" indicates the computed rule_uid. In one embodiment, the rule_uid is a cryptographic hash (such as MD5 or SHA1)—i.e., a 16 or 20 byte value. In another embodiment the rule_uid is the complete contents of the rule, treated as a long character string.

The "Rules Matched Per Packet" (RMPP) Measure

Figure 3:
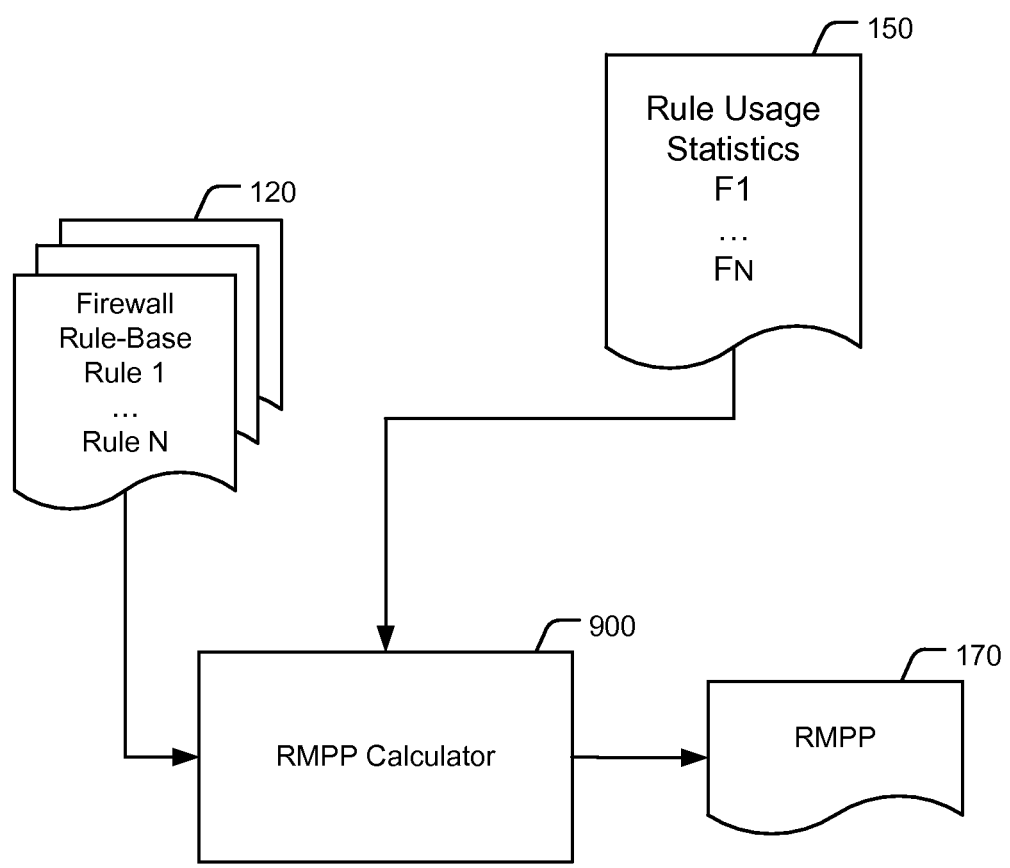
FIG. 3 is yet another high level schematic block diagram showing an aspect of the data processing system according to some embodiments of the invention.

FIG. 3 is a high level schematic block diagram showing an aspect of the data processing system according to some embodiments of the invention. Given rule usage statistics 150 and rule-base 120 there is a need to devise a model that connects the said statistics to the CPU utilization. Embodiments of the present invention teach that an appropriate model is based on a "Rules Matched Per Packet" (RMPP) calculation as discussed hereinafter in detail. The RMPP is a measure whose computation is given in the following formula:

$$RMPP = \sum_{i=1}^{N} (i * Fi) \quad (4)$$

Wherein in formula (4), N is the total number of rules and Fi, is the usage frequency of Rule i. Thus, the RMPP is a summation of N terms, each term consisting of the product of a rule sequence number "i" and Fi, the usage frequency of Rule i.

The motivation behind the RMPP calculation is as follows: In the case that the firewall has executed the First-Match-Semantics algorithm when filtering a given connection, and the rule that ultimately matched the connection is rule number "i" (here "i" is the rule's sequence number in the rule-base), then the firewall spent a computational effort testing whether the connection matched each of rules 1, 2, ..., i−1, until it arrived at rule "i", found that rule "i" matches the connection, and stopped. Consequently, the computational effort to filter this connection is approximately proportional to the sequence number "i". Therefore, in order model the general computational effort the firewall is spending, the mean (expected) number of rules that the firewall had to check against incoming connections is calculated, wherein the mean is weighted using rule usage statistics 150.

The RMPP is always a number between 1 and N. For examples: in the case that every connection is always matched by the first rule in the rule-base then RMPP=1. Conversely, if all the connections are matched by the last rule then RMPP=N. If neither of the extreme cases occurs then the RMPP will be a value larger than 1 and smaller than N: E.g., if rule 1 matches 50% of the connections, rule 10 matches 30%, and rule 25 patches 20%, then RMPP=1*0.5+10*0.3+25*0.2=0.5+3+5=8.5. This means that, on average, for the mix of connections observed in rule usage statistics 150, the firewall compares 8.5 rules to each connection it needs to filter in order to reach an action.

According to some embodiment of the invention, in order to reduce CPU usage, RMPP should be reduced. If RMPP is lowered toward 1, on average the firewall will compare fewer rules to each incoming connection—and thus its CPU utilization will drop accordingly.

Firewalls that Maintain a Rule-Base Per Interface

Thus far, the aforementioned description assumes implicitly that the firewall has a single rule-base containing N rules. This assumption is accurate for firewalls made by some vendors, such as Check Point. However, firewalls made by other vendors, such as Cisco and Juniper, maintain a separate rule-base per network interface card ("interface")—said interface may be physical or virtual. For such firewalls, an IP traffic connection crossing the firewall is in fact filtered twice: once via the rule-base attached to the interface on which the connection enters the firewall, and once via the rule-base attached to the interface on which the connection exits the firewall.

For such firewalls, the usage frequency of a rule is tied both to the interface that the rule's rule-base is attached to, and to the rule's sequence number in its rule-base. Thus we denote the Usage Statistics with two indices and refer to Fj,i as the Usage Frequency of Rule i within rule-base j. The calculation of the Usage Statistics remains unchanged, and follows the aforementioned methods.

Safe Firewall Rule Reordering

Changing the order of rules in a rule-base must be done with care. It is common to have multiple rules that match a given internet protocol (IP) connection—often with conflicting actions—and the "first-match semantics" determine which rule's action is ultimately applied. Carelessly moving a rule to an earlier location in the rule base can easily change the action that is applied to certain IP connections—thereby breaching the policy that the firewall is supposed to enforce.

According to some embodiments of the invention a rule movement is considered "Safe" if the resulting rule-base, after executing the rule move, causes the firewall to make exactly the same filtering actions the firewall made with the rule-base before the rule movement, on every possible IP connection.

The basic condition that needs to be tested when a rule movement is considered is the following: "given two adjacent rules, in positions x and x+1 in the rule-base, is it safe to swap the locations of the rules so rule x is moved to location x+1, and rule x+1 is moved to location x"? It is clear that any desired order of rules can be achieved through a multitude of such safe swap operations.

There are two conditions that makes a rule swap operation safe—it is enough that one condition applies to make the rule swap safe. The conditions are:

Same action: if both the rule in location x and the rule in location x+1 have the same action (e.g., both are "PASS" rules) then swapping their locations is Safe: perhaps some traffic that used to be matched by rule x+1 will be matched by rule x after the swap, and vice-versa, but since both have the same action—the firewall's overall policy is not changed.

Disjoint rules: if the rule in location x and the rule in location x+1 match completely different IP connections, and no connection can exist such that it matches both rules, then it is Safe to swap the rules FIG. 4 is a chart showing an aspect of the some embodiments of the present invention. In some embodiment of the invention, the optimal rule reordering is based on a pre-calculation of Block or Rules as depicted in FIG. 4. A Block of Rules is a list of consecutive rules in the rule-base, all of which have the same value in the Action column. In FIG. 4 there are provided 5 Blocks of Rules marked as B1-B5, where B1 consists of 2 DROP rules, B2 consists of 8 PASS rules, etc.

The importance of the blocks of rules is based on the following observation: Changing the order of rules inside any block of rules is guaranteed be always be Safe—because the condition of same action of always holds inside a block of the rules.

The Optimal Rule Reorder Algorithm

Given the rule usage statistics 150 and current firewall rule-base 220, the purpose of the rule reorder engine 300, as explained above, is to calculate two rule-bases that consist of the same rules from the current firewall rule-base 220, but with different rule orders: (a) the optimal firewall rule-base 420, and (b) the top-k firewall rule-base 520.

Referring back to FIG. 1 and FIG. 2, optimal firewall rule-base 420 uses a rule order that minimizes the RMPP among all possible Safe rule orders.

According to some embodiments of the invention, the optimal firewall rule-base 420 uses a rule order that minimizes the RMPP among all possible Safe rule orders that are restricted to only move rules inside Blocks of Rules: This is the "Block-Based Optimal Firewall Rule-Base". The method of calculating the block-based optimal firewall rule-base comprises: receiving rule usage statistics 150 and current firewall rule-base 220; letting the "Usage Frequency of Rule i" be indicated by Fi; calculating the Blocks of Rules B1, ..., Bm within the Current Firewall Rule-Base 220; within each Block of Rules Bt (for t between 1 and m), sorting the rules in decreasing order of frequencies Fi such that the rules with the highest frequencies in block Bt appear in the first rule locations in the block; and outputting the reordered list of the rules from all the blocks.

Clearly, block-based optimal firewall rule-base is both safe and has the minimal RMPP among all rule orders that are restricted to reorder rules only inside Blocks of Rules.

As a further step of the current invention, RMPP Calculator 420 may be used which is a implemented by executing formula (4), to calculate the Optimal RMPP 470 of the Optimal Firewall Rule-Base 420. The Optimal RMPP 470 can be compared to the Current RMPP 270 to inform the user of the best possible performance improvement that can be attained in the RMPP—for instance, by calculating the percentage of reduction in the RMPP from the Current RMPP 270 to the Optimal RMPP 470.

An alternate embodiment of the present invention does not restrict the reordering to Blocks of Rules—instead it restricts any rule movements to obey the aforementioned "Disjoint Rules" condition.

Yet another alternative embodiment of the present invention allows any rule movement that individually obeys either "Same action" condition or the "Disjoint Rules" condition. This embodiment is the least restrictive, and therefore may produce a rule-base with a lower RMPP. On the other hand this embodiment is more complex to implement.

Figure 5:
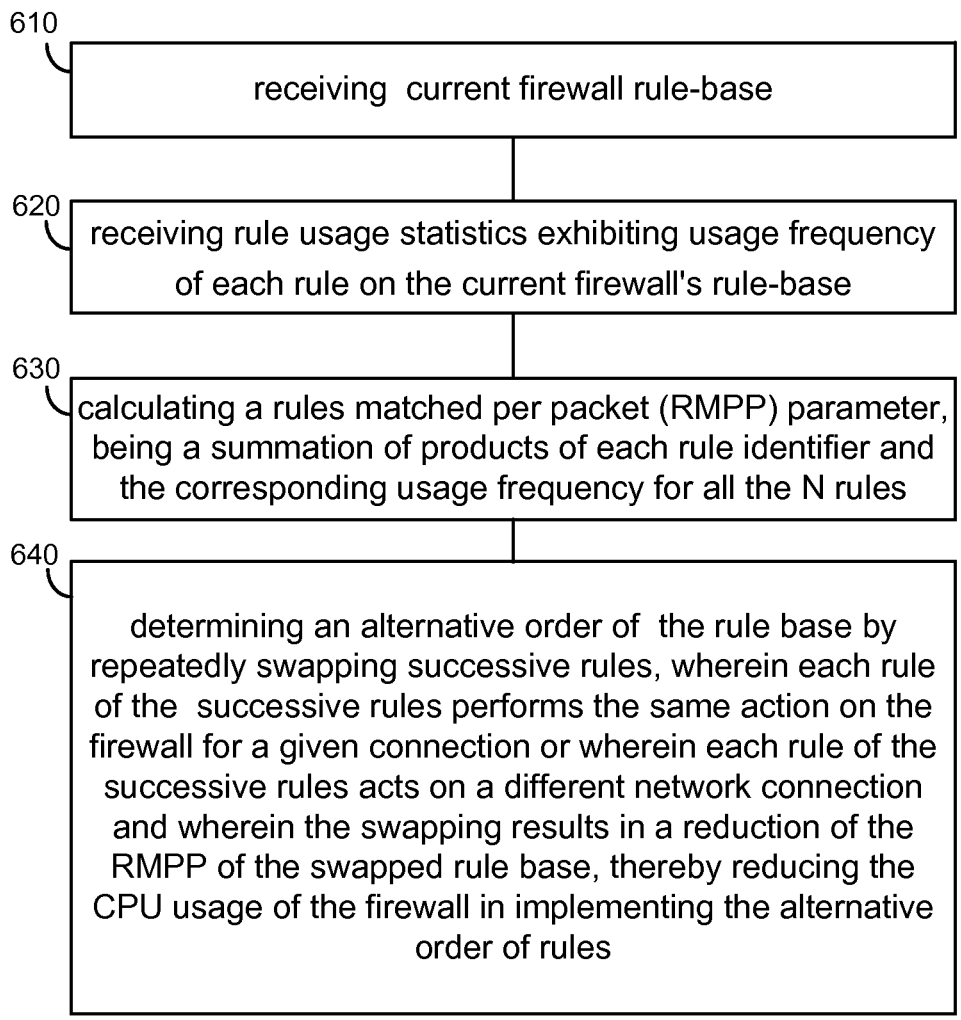
FIG. 5 is a high level flowchart illustrating the method according to some embodiments of the invention.

FIG. 5 is a high level flowchart illustrating the method according to some embodiments of the invention. The following method is not necessarily implemented with the aforementioned architecture. There is provided a computer implemented method of reducing central processing unit (CPU) usage of a firewall by safe reordering a current firewall's rule-base exhibiting N rules, each rule associated with a rule identifier affiliated with the order of applying the rule and a corresponding rule usage frequency, thereby creating an alternative order of the firewall's rules, the method comprising: receiving a current firewall's rule-base 610; receiving rule usage statistics exhibiting usage frequency of each rule on the current firewall's rule-base 620; calculating a rules matched per packet (RMPP) parameter, being a summation of products of each rule identifier and the corresponding usage frequency for all the N rules 630; and determining an alternative order of the rule base by repositioning rules which perform the same action on the firewall, or which act on disjoint sets of network connections, and wherein the repositioning results in a reduction of the RMPP of the reordered rule base, thereby reducing the CPU usage of the firewall in implementing the alternative order of rules. 640.

The Top-k Rule Movement Algorithm

The difficulty with optimal firewall rule-base 420 is that it may require a great number of individual rule movements to achieve. On firewalls with rule-bases consisting of thousands of rules it may take hundreds of thousands of individual rule movements to reach the optimum. This complexity poses a small obstacle if we allow computer software to actually order the rules. However, typically the user will not allow software to do so, since he or she has additional considerations besides optimizing the RMPP: for instance, the user may want to keep all the rules that relate to the same server, or to the same service, next to each other in the rule-base. Thus, the user will need to take the suggested order and execute the individual rule movements by hand. In such a situation, a list of thousands of rule movements is essentially useless, since implementing them will exceed any user's patience.

However, in many cases a very small number of individual rule movements exists, that, if implemented, yield most of the improvement in the RMPP at a fraction of the effort needed to implement the Firewall Rule-Base 420. To address this common situation, the Rule Reorder Engine 300 also computes the Top-k Firewall Rule-Base 520: This rule-base uses a rule order that minimizes the RMPP among all possible Safe rule orders that require at most k individual rule movements.

In a preferred embodiment of this invention the Top-k Firewall Rule-Base 520 uses a rule order that minimizes the RMPP among all possible Safe rule orders that require at most k individual rule movements that are further restricted to only move rules inside Blocks of Rules.

The method of calculating the Top-k Firewall Rule-Base 520 restricted to only move rules inside Blocks of Rules, comprises: receiving a number "k", the Rule Usage Statistics 150, and Current Firewall Rule-Base 220 and letting the "Usage Frequency of Rule i" be indicated by Fi; calculating the Blocks of Rules B1, . . . , Bm within the Current Firewall Rule-Base 220; copying the current firewall rule-base 220 into the Top-k Firewall Rule-Base 520; repeating the following steps k times: going over all N rules in the Top-k Firewall Rule 520 and letting i denote the number of the current candidate rule, and let Bi denote the Block of Rules to which rule i belongs to; calculating the RMPPi=the RMPP of the rule-base in which rule i is placed as the first rule in its block Bi, and letting iBest be the index i for which the RMPPi is smallest; outputting the recommendation to move rule iBest to be the first rule in its block Bi; updating the Top-k Firewall Rule-Base 520 so rule iBest is placed as the first rule in its block Bi; and outputting the Top-k Firewall Rule-Base 520.

Clearly, Top-k Firewall Rule-Base 520 is (a) Safe and (b) has the minimal RMPP among all rule orders that require at most k individual rule movements that are further restricted to reorder rules only inside Blocks of Rules.

As a further step of the current invention, RMPP Calculator 520—which is a implemented by executing the aforementioned formula (4) to calculate the Top-k RMPP 570 of the Top-k Firewall Rule-Base 520. The Top-k RMPP can be compared to the Current RMPP 270 to inform the user of the performance improvement that can be attained in the RMPP using up to k individual rule movements—for instance, by calculating the percentage of reduction in the RMPP from the Current RMPP 270 to the Top-k RMPP 570.

Special Cases

There are several cases of rules that require special treatment within the Rule Reorder Engine 300. These include: Rules without logging, Disabled rules, and Rules without logging In some cases the user may have configured certain rules in the firewall rule-base to not produce log records. If the Rule Usage Statistics 150 are based on a log file then the calculation of the Usage Frequency of Rule i for such a rule i will result in an artificial value Fi=0, since there are no log records that correspond to rule i. A frequency of Fi=0 will cause the Rule Reorder Engine 30 to place rule i at the end of its Block in the Optimal Firewall Rule-Base 420, and to possibly suggest to place other rules before rule i in the Top-k Firewall Rule-Base 520. However, such recommendations may lead to a deterioration of the firewall CPU utilization in case the Rules without Logging actually match a significant fraction of the connections going through the firewall.

To avoid making unfounded recommendations regarding Rules without Logging, a preferred embodiment of this invention starts a new Block of Rules (and ends the previous Block of Rules) with every rule that is configured to not produce log records.

Disabled Rules: In some cases the user may have configured certain rules in the firewall rule-base to be disabled. This means that these rules still appear in the rule-base, and still have a rule number (so all the rules after them have a number that takes the disabled rules into account). However, disabled rules do not really contribute to the CPU utilization of the firewalls since the firewall does not attempt to match them to connections. Furthermore, disabled rules may have produced log records at a time prior to their being marked as disabled. Thus the Usage Frequency of Rule i for such a rule i may result a value Fi>0. A similar condition may occur if the if the Rule Usage Statistics 150 are based on hit counters.

Disabled rules create two problems for the rule reorder engine 300: (a) the RMPP contribution of other non-disabled rules is inflated because the rule index number of these rules includes the disabled rules, and (b) a non-zero frequency Fi may cause the Rule Reorder Engine 300 to place rule i too high in its Block in the Optimal Firewall Rule-Base 420, and to possibly suggest to place it before other rules in the Top-k Firewall Rule-Base 520. However, such recommendations may lead to a deterioration of the firewall CPU utilization, since they are based on an incorrect model.

To avoid making unfounded recommendations regarding Disabled Rules, a preferred embodiment of this invention sets Logsi=0 for Disabled Rules and ensure that TotalLogs does not to count Disabled Rules in its calculation of the Rule Usage Statistics 150. This ensures a value of Fi=0 for such rules and avoids distorting the frequencies of other rules. Furthermore, a preferred embodiment of this invention renumbers the non-disabled rules and uses the renumbered rules in the RMPP Calculator 120.

According to some embodiments of the invention, the system can be implemented in digital electronic circuitry, or in computer hardware, firmware, software, or in combinations thereof.

Suitable processors may be used to implement the data processing system, computer implemented method and computer program product. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage devices suitable for tangibly embodying computer program instructions and data include all forms of nonvolatile memory, including by way of example semiconductor memory devices, such as EPROM, EEPROM, and flash memory devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method of reducing central processing unit (CPU) usage of a firewall by safe reordering a current firewall's rule-base exhibiting N rules, each rule associated with a rule identifier affiliated with the order of applying the rule and a corresponding rule usage frequency, thereby creating an alternative order of the firewall's rules, the method comprising:

receiving rule usage statistics exhibiting usage frequency of each rule on the current firewall's rule-base;

calculating a rules matched per packet (RMPP) parameter, being a summation of products of each rule identifier and the corresponding usage frequency for all the N rules; and determining an alternative order of the rule base by sorting rules which perform the same action on the firewall based on usage statistics, wherein the sorting results in a reduction of the RMPP of the reordered rule base, thereby reducing the CPU usage of the firewall in implementing the alternative order of rules, wherein receiving rule usage statistics exhibiting usage frequency of each rule on the current firewall's rule-base is preceded by partitioning the current firewall's rule-base into blocks of rules wherein each block exhibits rules that result in an identical action of the firewall, wherein the sorting of the rules is performed within each block of rules independently, and wherein the sorting of the rules is performed utilizing a sorting algorithm that sorts neighboring and non-neighboring rules.

2. The computer implemented method according to claim 1, wherein the sorting of the rules is performed repeatedly until the RMPP is reduced to a minimum.

3. The computer implemented method according to claim 1, wherein a sub-optimal reordering is achieved by sorting only k rules, wherein k<N and wherein the k rules are selected as the k rules that in comparison to any other k rules from the rule-base reduce the RMPP to a minimum and N−k rules are not sorted.

4. The computer implemented method according to claim 3, wherein k is less than 10% of N to reduce complexity of the reordering.

5. The method according to claim 1, wherein rule usage statistics are based on a log file.

6. The method according to claim 1, wherein the rule usage statistics are based on hit counters.

7. The method according to claim 1, wherein the rule usage statistics account for rule insertions and deletions.

8. The method according to claim 1, wherein the firewall has more than one interface and a separate rule-base for each interface of the firewall.

9. A computer implemented data processing system for reducing central processing unit (CPU) usage of a firewall by safe reordering a current firewall's rule-base exhibiting N rules, each rule associated with a rule identifier affiliated with the order of applying the rule and a corresponding rule usage frequency, thereby creating an alternative order of the firewall's rules, the system comprising:

a rule reorder engine; and a rules matched per packet (RMPP) calculator, wherein rule usage statistics exhibiting usage frequency of each rule on the current firewall's rule-base are fed into the rule reorder engine, wherein the RMPP calculator receives the current firewall's rule base and calculates the RMPP, being a summation of products of each rule identifier and the corresponding usage frequency for all the N rules using the RMPP calculator, wherein the rule reorder engine determines an alternative order of the rule base, in cooperation with the RMPP calculator, by sorting rules and recalculating the RMPP of the reordered rule base, wherein the repositioned rules perform the same action on the firewall, and wherein the sorting results in a reduction of the RMPP of the reordered rule base, thereby reducing the CPU usage of the firewall in implementing the alternative order of rules, and wherein the system further partitions the current firewall's rule-base into blocks of rules wherein each block exhibits rules that result in an identical action of the firewall, wherein the rule reorder engine repeatedly sorts rules within each block of rules independently, and wherein the rule reorder engine utilizes a sorting algorithm that sorts neighboring and non-neighboring rules.

10. The computer implemented data processing system according to claim 9, wherein the rule reorder engine repositions rules until the RMPP is reduced to a minimum thereby achieving a reordering that requires minimum CPU usage.

11. The computer implemented data processing system according to claim 9, wherein the rule reorder engine repositions only k selected rules, wherein k<N and wherein the k rules are selected as the k rules that in comparison to other k rules that are selected reduce the RMPP to a minimum.

12. The computer implemented data processing system according to claim 11, wherein k is less than 10% of N to reduce complexity of the reordering.

13. The computer implemented data processing system according to claim 9, wherein rule usage statistics are based on a log file.

14. The computer implemented data processing system according to claim 9, wherein the rule usage statistics are based on hit counters.

15. The computer implemented data processing system according to claim 9, wherein the rule usage statistics account for rule insertions and deletions.

16. The method according to claim 9, wherein the firewall has more than one interface and a separate rule-base for each interface of the firewall.

* * * * *